United States Patent [19]

Walp

[11] Patent Number: 4,894,797
[45] Date of Patent: Jan. 16, 1990

[54] FIFO DATA STORAGE SYSTEM USING PLA CONTROLLED MULTIPLEXER FOR CONCURRENT READING AND WRITING OF REGISTERS BY DIFFERENT CONTROLLERS

[75] Inventor: Patrick K. Walp, Penngrove, Calif.

[73] Assignee: AMP Incorporated, Harrisburg, Pa.

[21] Appl. No.: 210,147

[22] Filed: Jun. 16, 1988

Related U.S. Application Data

[63] Continuation of Ser. No. 931,505, Nov. 17, 1986, abandoned.

[51] Int. Cl.$^4$ .................... G06F 13/00; G06F 13/10; G06F 13/12
[52] U.S. Cl. .................... 364/900; 364/940; 364/942; 364/942.03; 364/965; 364/965.2; 364/965.9; 364/965.7; 364/968
[58] Field of Search ... 364/200 MS File, 900 MS File, 364/200, 900; 370/85

[56] References Cited

U.S. PATENT DOCUMENTS

| | | | |
|---|---|---|---|
| 4,125,869 | 11/1978 | Gutmann | 364/900 |
| 4,166,289 | 8/1979 | Murtha et al. | 364/200 |
| 4,423,480 | 12/1983 | Bauer et al. | 364/200 |
| 4,479,178 | 10/1984 | Schabowski | 364/200 |
| 4,486,854 | 12/1984 | Yuni | 364/900 |
| 4,525,804 | 6/1985 | Mosier et al. | 364/900 |
| 4,597,084 | 6/1986 | Dynneson et al. | 364/200 |
| 4,600,986 | 7/1986 | Scheuneman | 364/900 |
| 4,633,434 | 12/1986 | Scheuneman | 364/900 |
| 4,642,797 | 2/1987 | Hoberman | 364/900 |
| 4,674,032 | 6/1987 | Michaelson | 364/200 |
| 4,680,730 | 7/1987 | Omoda et al. | 364/900 |
| 4,744,078 | 5/1988 | Kowalczyk | 370/85 |

OTHER PUBLICATIONS

TTL Data Manual, San Francisco, Uniplan, 1978.
"The American Heritage Dictionary", (Second College Edition) (1982), p. 214, (Buffer).
Ralston et al., "Encyclopedia of Computer Science", Charter Publishers, Inc. (1976), pp. 187–188.

Primary Examiner—Archie E. Williams, Jr.
Assistant Examiner—Robert B. Harrell
Attorney, Agent, or Firm—David L. Smith

[57] ABSTRACT

A first-in-first out (FIFO) register 100 for storage of up to two-bytes of data is operable by two control units 10, 20 for simultaneous read and write operations with no wait states. The FIFO register 100 comprises a first register 101, a second register 102 and a controller U35. The first register 101 may be multplexed between the two control units 10, 20 for write operations by either unit. The second register 102 is in communication with the first register 101 and may be read by either control unit 10, 20. Data is transferred from the first register 101 to the second register 102 under the direction of the controller U35 such that data may be read by one control unit 10, 20 while data is being simultaneously written by the other control unit 10, 20.

2 Claims, 3 Drawing Sheets

FIFO DATA STORAGE SYSTEM USING PLA CONTROLLED MULTIPLEXER FOR CONCURRENT READING AND WRITING OF REGISTERS BY DIFFERENT CONTROLLERS

This application is a continuation of application Ser. No. 931,505 filed Nov. 17, 1986, now abandoned.

BACKGROUND OF THE INVENTION

The present invention relates to a first-in, first-out data register whereupon read and write operations can be simultaneously performed.

A first-in, first-out (FIFO) register is basically a storage array for a series of data units such as bytes or words. The data units are placed in the register by writing to the register and are removed therefrom by reading from the register. Each data unit is removed from the register in the order of its placement relative to the remaining data units. Thus, the first data unit written to the register is the first data unit read from the register. Subsequent read operations remove data units which were added to the register immediately after the previously read data unit was added.

A FIFO register may be used in a variety of applications. One application is in the storage and retrieval of packets of digital information by a control unit. When storage is needed, the control unit checks to see if the FIFO register is full and, if not, adds data. Similarly, when retrieval is desired, the control unit checks to see that the FIFO register is empty and, if not, removes the data. In this application, only one control unit is involved and therefore simultaneous read and write operations are not encountered.

A different situation arises when two control units must store and retrieve data through the same FIFO register. One such application is the use of the FIFO register as a communication link between two control units. Conventional FIFO registers do not permit read and write operations to be performed simultaneously. If a read and a write operation are requested, one of the operation requests is generally required to wait for the other operation to complete. This results in inefficient use of the FIFO register and an increase in control unit processing costs.

SUMMARY OF THE INVENTION

The present invention is directed to a first-in, first-out register wherein valid data may be written to and read from the register simultaneously by two control units without a substantial delay in the completion of either operation.

According to a preferred embodiment of the present invention, the FIFO register comprises a first register, a second register and a controller. The first register comprises a first and second storage multiplexer. Each multiplexer can store four bits of data and comprises two sets of inputs. One set of inputs of each multiplexer is connected to the first control unit and the other set of inputs of each multiplexer is connected to the second control unit. The storage units within each multiplexer are multiplexed between the two sets of inputs by a control signal supplied by the controller. Thus, the first register is capable of storing an 8-bit data unit supplied by either of the two control units.

The second register comprises a first and second octal latch. Each latch can store 8-bits of data and comprises eight inputs. The low order half of the inputs of each latch are connected to the outputs of the first multiplexer and the high order half of the inputs of each latch are connected to the outputs of the second multiplexer. Thus, the data stored in the first latch is identical to that stored in the second latch. The storing of the data within the latches is controlled by a signal supplied by the controller. The stored data contained within the first latch may be read by the first control unit and the stored data contained within the second latch may be read by the second control unit. The reading of the latches is controlled by the respective control units.

The controller is a programmed logic array. The controller receives read and write operation requests and controls the data flow from the first register to the second register. The controller also provides signals indicative of the status of the FIFO register. Data is placed in the FIFO register through the first register and is removed from the second register. The controller provides appropriate control signals to allow the FIFO register to be simultaneously read from and written to by the control units.

One advantage of the preferred embodiment is that a control unit reading or writing to the FIFO register may do so simultaneously with the writing or reading of the FIFO register by at least one other control unit. Since there are no wait states with the preferred embodiment, processing of the data and general processing by the control units may be performed more efficiently.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENT

Figure 1:
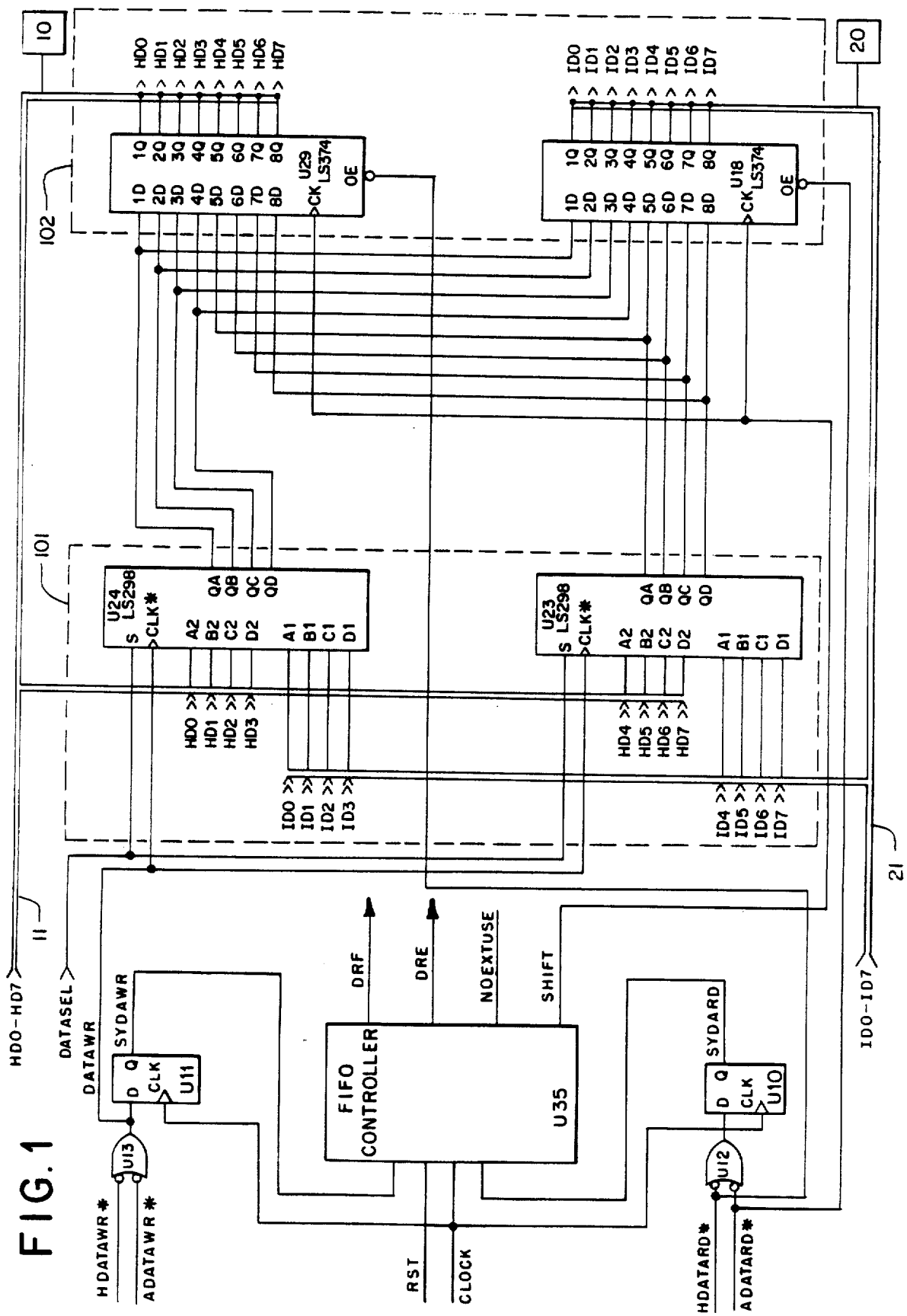
FIG. 1 is a schematic representation of the preferred embodiment of the present invention.

Turning now to the drawings, FIG. 1 is a schematic representation of the preferred embodiment of the FIFO register of the present invention. The FIFO register is generally represented by the numeral 100 and receives control information and operation requests from two control units 10, 20. The control information is provided by a clock signal CLOCK, a dataset select signal DATASEL, and a reset signal RST. The signal CLOCK must be of sufficient frequency to present at least one active clock edge during any read or write request pulse issued by either control unit 10, 20. The operation request information is provided by read request signals HDATARD*, ADATARD* and write request signals HDATAWR*, ADATAWR* from the respective control units 10, 20. The asterisk symbol "*" is used throughout this document to indicate that the corresponding signal is of active low logic.

The production of the control and operation request signals is dependent upon the particular application of the FIFO register 100 and will be known to those skilled in the art. A more detailed description of these signals is not necessary for an understanding of the present invention and will therefore not be given.

The FIFO register 100 comprises a first and second OR-gate U12, U13, a first and second flip-flop circuit U10, U11, a first and second register 101, 102, and a controller U35. The OR-gates U12, U13 and the flip-flop circuits U10, U11 synchronize the operation request information with the clock signal CLOCK. The write request signals HDATAWR*, ADATAWR* are applied to the negating inputs of the OR-gate U13 to generate an active high data write signal DATAWR. The signal DATAWR is applied to the first register 101 and to the flip-flop circuit U11. The flip-flop circuit U11, which is also connected to the clock signal CLOCK, produces a synchronized write signal SYDAWR which is applied to the controller U35. Similar circuitry U12, U10 is used to generate, from the read request signals HDATARD*, ADATARD*, a synchronized data read signal SYDARD which is also applied to the controller U35.

The first register 101 comprises a first and second quadruple storage multiplexer U24, U23. Each multiplexer U24, U23 comprises a dataset select input S, a clock input CLK*, a first and second set of data inputs A1-D1, A2-D2 and a set of data outputs QA-QD. The dataset select inputs S of the multiplexers U23, U24 determine which set of inputs, first or second, will be applied to the outputs QA-QD of each multiplexer. The dataset select inputs S of both multiplexers U23, U24 are connected to the input line DATASEL for operation by the control units 10, 20.

The clock inputs CLK* of the multiplexers U23, U24 are connected to the output of the OR-gate U13 to receive the signal DATAWR and control the application of the selected input data to the outputs QA-QD. The first set of data inputs A1-D1 of each multiplexer U23, U24 is connected to the four low order data lines ID0-ID7 of the bus 21. The second set of data inputs A2-D2 of each multiplexer U23, U24 is connected to the four high order data lines HD0-HD7 of the bus 11. Thus, the multiplexer U24 stores the low order nibble of the data byte and the multiplexer U23 stores the high order nibble of the data byte.

The second register 102 comprises a first and second octal latch U29, U18. Each latch U29, U18 is a complete 8-bit register and comprises a set of inputs 1D-8D, a set of outputs 1Q-8Q, a clock input CK and an output enable input OE. The first four inputs 1D-4D of the latch U29 are connected to the respective outputs QA-QD of the multiplexer U24. The second four inputs 5D-8D are connected to the respective outputs QA-QD of the multiplexer U23. Similarly, the first four inputs 1D-4D of the latch U18 are connected to the respective outputs QA-QD of the multiplexer U24 and the second four inputs 5D-8D are connected to the respective outputs QA-QD of the multiplexer U23. Thus, the latch U29 receives the same data from the register 101 as does the latch U18.

The low order nibble and the high order nibble of data presented by the multiplexers U23, U24 is simultaneously clocked into the latches U18, U29 by a control signal SHIFT applied to the clock inputs CK. The signal SHIFT is produced by the controller U35 and is described in detail below. The outputs 1Q-8Q of the latch U29 are applied to the respective data lines HD0-HD7 of the bus 11 when the data read signal HDATARD* from the first control unit 10 is applied to the enable input OE of the latch U29. Similarly, the outputs 1Q-8Q of the latch U18 are applied to the respective data lines ID0-ID7 of the bus 21 when the data read signal ADATARD* from the second control unit 20 is applied to the enable input OE of the latch U18. Thus, the data byte, which is identically stored in the latches U29, U18, is available to either the first control unit 10 or the second control unit 20.

Figure 2:
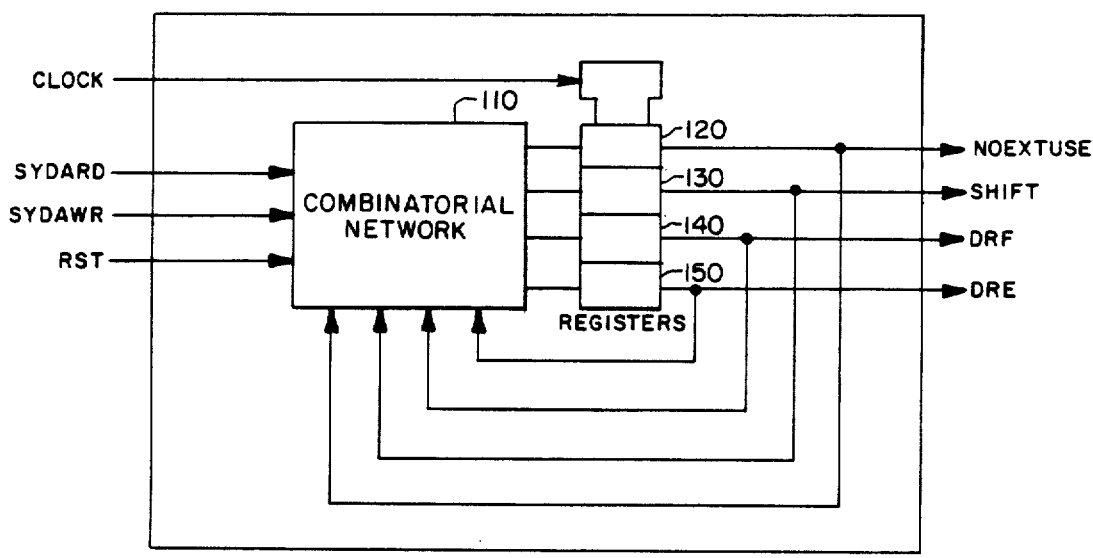
FIG. 2 is a block representation of the FIFO controller of the embodiment of FIG. 1.

The controller U35 is a programmed logic array and is schematically represented in FIG. 2 as comprising a combinatorial network 110 and registers 120, 130, 140, 150. The controller U35 receives the clock signal CLOCK, the synchronized data read request SYDARD, the synchronized data write request SYDAWR, and the reset signal RST. The controller U35 processes these signals to produce a data register full signal DRF and a data register empty signal DRE. In addition, the controller produces the control signal SHIFT to control the flow of data from the first register 101 to the second register 102. A fourth signal NOEXTUSE is also produced by the controller U35. However, this signal is not used externally to the controller U35.

The output signals NOEXTUSE, SHIFT, DRE, DRF are stored in the respective registers 120, 130, 140, 150, and are fed back to the combinatorial network 110. The network 110 is programmed to generate the output signals in accordance with the following boolean relationships:

---

NOEXTUSE = (DRE* & DRF & SHIFT* & SYDAWR
NOEXTUSE & DRF & SHIFT
NOEXTUSE & DRE & DRF* & SHIFT* & SYDAWR*
DRE* & DRF & SHIFT & SYDARD* & SYDAWR*
NOEXTUSE* & DRE & DRF* & SHIFT & SYDARD*
& SYDAWR*
NOEXTUSE & DRE* & DRF & SYDARD*);
SHIFT = (DRE* & DRF & SHIFT* & SYDAWR
NOEXTUSE & DRE* & DRF & SYDAWR
NOEXTUSE* & DRE & DRF & SYDAWR*
NOEXTUSE* & DRF & SYDARD* & SYDAWR
NOEXTUSE* & DRE & SHIFT & SYDARD &
SYDAWR*);
DRE = (NOEXTUSE & DRE & DRF & SHIFT
DRE & DRF* & SHIFT*
NOEXTUSE* & DRF* & SHIFT* & SYDARD*
NOEXTUSE* & DRE & DRF* & SYDARD*
NOEXTUSE* & SHIFT* & SYDARD* & SYDAWR*
NOEXTUSE* & DRE & SYDAWR*); and
DRF = (DRE* & DRF & SHIFT*
NOEXTUSE & DRE* & DRF
NOEXTUSE* & DRF* & SHIFT* & SYDAWR*
NOEXTUSE* & DRF & SYDARD*
DRE* & DRF & SYDAWR*).

Where # represents the boolean OR operation and & represents the boolean AND operation.

---

The status signals DRE, DRF indicate the storage status of the FIFO register 100. If DRE is a logical 1, there is space for at least one byte of data to be written to the FIFO register 100. If DRF is a logical 1, there is at least one byte ready to be read from the FIFO register 100. If both DRE and DRF are logical ones, there is one byte of data ready to be read and space for one byte of data to be written to the register 100.

The FIFO register 100 has primarily three stable operating states: an EMPTY state, a HALF-FULL state and a FULL state. These states are represented as circles in the simplified state diagram of FIG. 3. Transitions between the states are indicated by arrows and occur when a write or a read operation is performed on the FIFO register 100. The operation producing the transition is indicated next to the transition arrow and can be either a read or a write operation. A read operation removes data from the FIFO register 100 by means of the second register 101 and a write operation puts data into the FIFO register 100 by means of the first register 102.

Since data may only be written to the first register 101 and read only from the second register 102, data must be internally transferred from the first register 101 to the second register 102 during selected operations. The selected operations are identified in FIG. 3 by enclosing the operation label within a box. The transfer of the data between the registers 101, 102 is controlled by the FIFO controller output signal SHIFT. The data stored in the first register 101 is copied into the second register 102 when the signal SHIFT makes a low to high transition.

Either control unit 10, 20 may initiate a read or write operation. In a write operation, the logical state of the line DATASEL determines to which input lines the internal storage units of the multiplexers U24, U23 will be connected. The signal line DATASEL must be pulled to the logical low state for writing by the control unit 10 and pulled to the logical high state for writing by the control unit 20. One of the control units 10, 20 then issues a write request pulse HDATAWR*, ADATAWR* to generate the data write signal DATAWR. The data to be written is then latched from the selected data lines HD0-HD7, ID0-ID7 into the storage multiplexers U24, U23. The write request signals HDATAWR*, ADATAWR* are also applied to the OR-gate U13 and flip-flop circuit U11 to generate the synchronized data write signal SYDAWR which is applied to the controller U35. If an internal data transfer is required, the controller U35 generates the control signal SHIFT to latch the data from the outputs QA-QD of the multiplexers U24, U23 into the latches U29, U18. Of course, since the dataset select inputs S of the multiplexers U35 are tied together and since register 101 can only hold one byte of data, only one controller may write to the FIFO register 100 at a given time.

In a read operation, one of the control units 10, 20 generates the respective read request signal HDATARD*, ADATARD*. The signal is applied to the output enable input of the appropriate latch U29, U18 causing the stored data to be applied to the respective data lines HD0-HD7, ID0-ID7. The read request signal is also applied to the OR-gate U12 and flip-flop circuit U10 to generate a synchronized data read signal SYDARD which is applied to the controller U35. If an internal data transfer is required, the controller U35 generates the control signal SHIFT to latch the data stored in the multiplexers U24, U23 into the latches U29, U18. In both the read and write operations the controller U35 maintains an indication of the status of the FIFO register 100 by means of the signals DRE, DRF.

Figure 3:
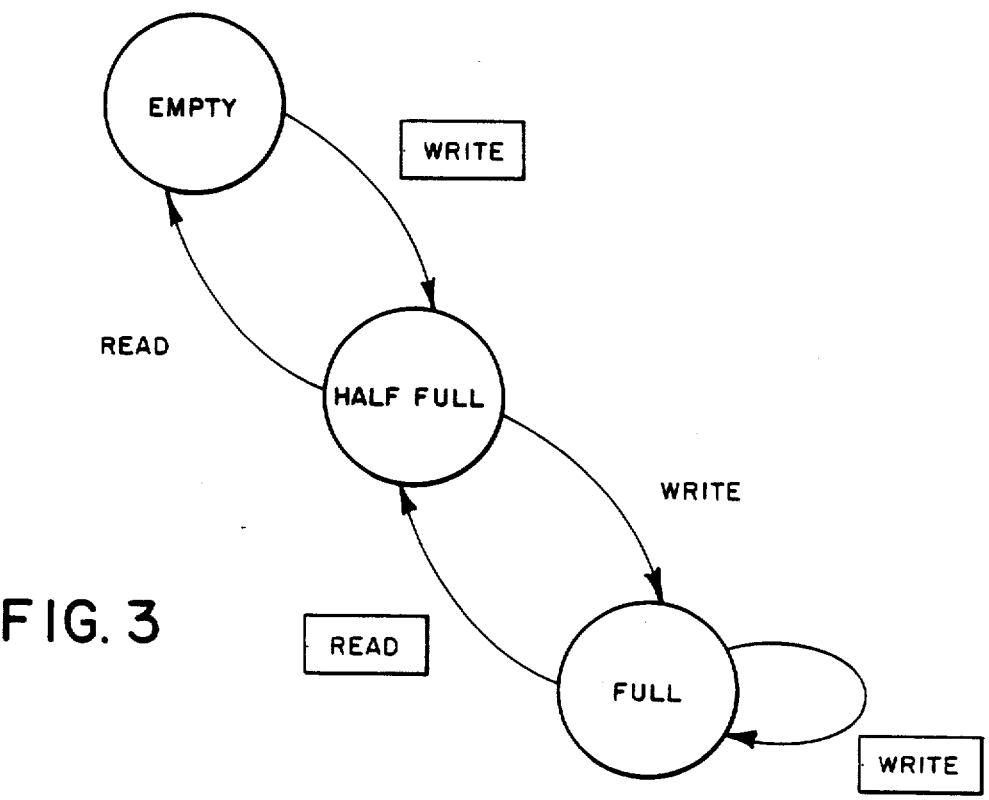
FIG. 3 is a simplified state diagram of the embodiment of FIG. 1.

The internal data transfer is necessary during certain operations so that data written to the first register 101 may be read from the second register 102. If the FIFO register 100 is empty, the first and second registers 101, 102 contain non-valid data and the FIFO is defined to be in the EMPTY state. If a write operation is then performed, data will be placed in the first register 101 and the FIFO register 100 will make a transition from the EMPTY state to the HALF-FULL state as shown in FIG. 3. However, since the data can only be read from the second register 102, the data must be transferred to that register so that not only is the data ready to be read, but also so that the first register 101 is ready to store a second unit of data.

If a subsequent read operation occurs, a further internal transfer is not required since the data has already been transferred into the second register 102. Similarly, if a write operation is performed from the HALF-FULL state, an internal transfer of the data is unnecessary. The subsequent write operation causes the second byte of data to be placed in the first register 101. Additional write operations however require that data be transferred from the first register 101 to the second register 102. This allows the FIFO register 100 to be flushed of unwanted data.

If a read operation is performed when the FIFO register 100 is in the FULL state, the data byte contained in the second register 102 is removed. The data byte in the first register 101 may then be transferred into the second register 102 and the FIFO register 100 is again in the HALF-FULL state.

As mentioned above, the state diagram in FIG. 3, as well as the associated textual description, is greatly simplified. A more complete state diagram of the FIFO register 100 is provided in FIG. 4. This state diagram is more complete in that it discloses intermediate states which account for the ability of the FIFO register 100 to handle simultaneous read and write requests from two control units.

Figure 4:
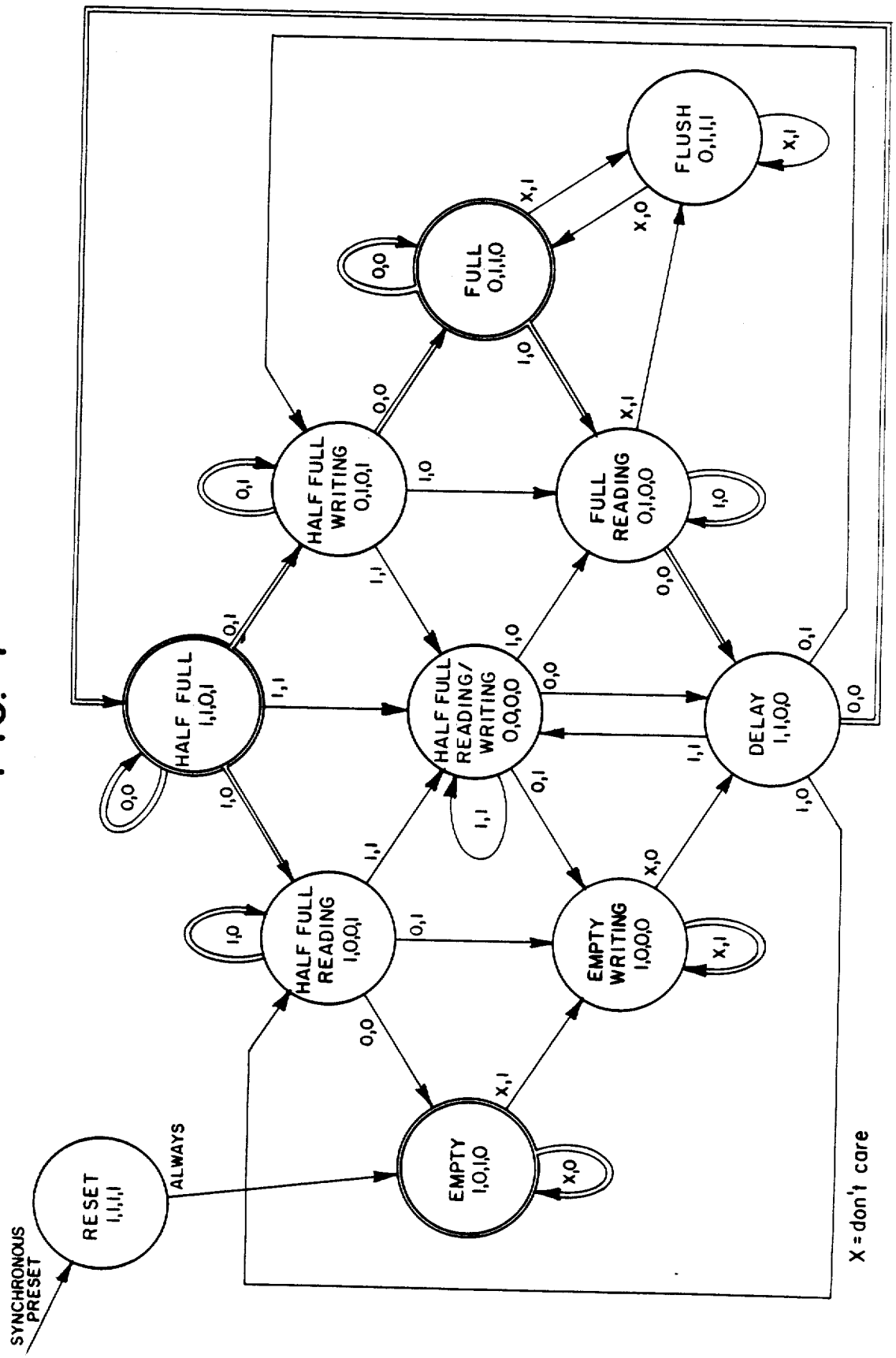
FIG. 4 is a complete state diagram of the embodiment of FIG. 1.

In the state diagram of FIG. 4, the double circles represent the three stable states EMPTY, HALF-FULL and FULL. The single circles represent the intermediate states HALF-FULL READING, HALF-FULL WRITING, HALF-FULL READING/WRITING, EMPTY WRITING, FULL READING, DELAY, FLUSH and RESET. Within each circle is given a state bit vector SBV. The vector SBV represents the status of each of the controller output signals DRE, DRF, NOEXTUSE, SHIFT. If SBV=0,0,0,0, the respective controller signals are inactive; if SBV=1,1,1,1, the respective controller signals are active.

The arrows interconnecting the circles indicate allowable transitions between the states. Double arrows indicate the more common transitions; single arrows indicate the less common transitions. A transition bit vector TBV is provided next to each arrow to indicate the requested FIFO register operation. The vector TBV represents the status of the controller input signals SYDARD, SYDAWR. If TBV=1,0, a read operation is requested; if TBV=0,1 a write operation is requested; if TBV=1,1 a read and a write operation are requested; and so on. If a vector bit of TBV is represented by an x, then the transition is independent of that operation request.

The FIFO register 100, once in the EMPTY state, will remain in that state, independent of a read request, until a write operation is requested. This condition is indicated in FIG. 4 by the double transition arrow and the vector TBV having the value x,0. The EMPTY state is entered from the RESET and HALF-FULL READING states. A transition from the EMPTY state can occur only to the EMPTY WRITING state and is initiated by a write operation request.

The EMPTY WRITING state is entered from the EMPTY, HALF-FULL READING and HALF-FULL READING/WRITING states. These transitions occur by means of a write request operation as indicated in FIG. 4 by the vector TBV. A transition may occur from the EMPTY WRITING state only to the DELAY state. The removal of the write request results in this transition.

As previously stated, when data needs to be transferred from the first register 101 to the second register 102, the con troller U35 causes the signal SHIFT to undergo a low to high transition. This transition is reflected in the value of the last bit position of vector SBV. When the SHIFT bit of the vector SBV changes from a 0 to a 1, an internal data transfer is indicated.

The DELAY state provides the FIFO register 100 with a sufficient time delay to allow the controller signal SHIFT to make the transition from low to high one clock period after the trailing edge of any read or write request pulse. The delay occurs because the controller U35 waits for the various signal lines to attain the proper states which satisfy the boolean expression for the production of the signal SHIFT, given above. This time delay ensures the proper transfer and latching of the data.

The DELAY state may be entered from the HALF-FULL READING/WRITING, EMPTY WRITING and FULL READING states since these states all require an internal data transfer to be performed. Transitions from the DELAY state to the HALF-FULL READING/WRITING, HALF-FULL WRITING, HALF-FULL READING and HALF-FULL states occur under operation requests as indicated by the respective vectors TBV in FIG. 4. Each of these transitions requires an internal data transfer as indicated by the change in the respective vectors SBV.

The HALF-FULL READING state may be entered from the DELAY and HALF-FULL states. In this state the FIFO register 100 contains one byte of data and a read operation has been initiated. Transitions from this state may occur to the EMPTY, EMPTY WRITING and HALF-FULL READING/WRITING states as determined by the operations indicated by the vectors TBV.

The HALF-FULL READING/WRITING state may be entered from the HALF-FULL, HALF-FULL WRITING, DELAY, and HALF-FULL READING states. In this state, both read and write operations have been requested. Transitions may occur from this state to the FULL READING, DELAY and EMPTY WRITING states.

The FULL-READING state may be entered from the HALF-FULL WRITING, FULL and HALF-FULL READING/WRITING states. In this state, the FIFO register 100 is full of data and a read operation has been initiated. Transitions may occur from this state to the FLUSH and DELAY states. A transition to the FLUSH state results in an internal data transfer as indicated by the change in the vector SBV.

The HALF-FULL state may be entered only from the DELAY state. This transition results in an internal data transfer operation being performed as indicated by the vector SBV. Transitions may occur from the HALF-FULL state to the HALF-FULL WRITING, HALF-FULL READING/WRITING and the HALF-FULL READING states.

The HALF-FULL WRITING state may be entered from the HALF-FULL and DELAY states. An internal data transfer operation occurs if the transition is made out of the DELAY state as indicated by the change in the vector SBV. Transitions may occur from this state to the FULL, FULL READING and HALF-FULL READING/WRITING states.

The FULL state may be entered from the FLUSH and HALF-FULL WRITING states. Transitions may occur from the FULL state to the FLUSH and FULL READING states. An internal data transfer will occur in the transition to the FLUSH state as indicated by the change in the vector SBV.

The FLUSH state may be entered from the FULL READING and the FULL states. In each case an internal data transfer is performed. As the name implies, the FLUSH state allows the FIFO register 100 to flush out unwanted data. Transitions from this state are only permitted to the FULL state.

The RESET state is entered into only if a reset operation is performed. The change from the RESET state to the EMPTY state is the only allowable transition out of the RESET state.

The operation of the FIFO register 100 is best described with reference to the state diagram in FIG. 4. Since the operation of the FIFO register 100 is so fully expressed in the state diagram of FIG. 4, the operation description need only consist of two examples. The first example begins with a resetting of the FIFO register 100 and follows with two successive write and one read operations.

In a reset operation, the reset signal RST is applied to the controller U35, causing the controller output signals DRE, DRF, NOEXTUSE, SHIFT to respectively occupy the logical high state. The status of each output signal is indicated by the vector SBV whose value is 1,1,1,1. Upon release of the reset signal RST, the FIFO register 100 immediately enters the EMPTY state wherein the vector SBV becomes 1,0,1,0. The FIFO register 100 remains in the EMPTY state until the first write operation of the example is requested.

The write operation request is indicated by the vector TBV whose value is x,1, where x represents either a 0 or a 1. The write request causes the FIFO register 100 to enter the EMPTY WRITING intermediate state. The FIFO register 100 will remain in this state until the write request is removed.

Upon removal of the request, the FIFO register 100 enters the DELAY state with a vector SBV value of 1,1,0,0. The vector bits DRE and DRF indicate that the FIFO register 100 has one byte of data to be read and can receive one more byte of data. At the expiration of the delay, the vector TBV has a value of 0,0 indicating that the FIFO register 100 enters the HALF-FULL state. In this state, the bit SHIFT of the vector SBV has changed from a 0 to a 1, thereby indicating an internal transfer of the data byte from the first register 101 into the second register 102 as previously discussed. The FIFO register 100 will remain in this stable state until a write or read request is performed.

When the second write operation of this example is requested, the vector TBV becomes 0,1 and the FIFO register 100 enters the HALF-FULL WRITING state. In this state, the vector SBV has a value of 0,1,0,1 indicating that the FIFO register 100 is full. When the write request is removed, the FIFO register 100 enters the FULL state where it remains until a read or write operation is performed.

Any subsequent write operation when the FIFO register 100 is in the FULL state would cause the FIFO register 100 to enter the FLUSH state. Upon entering this state, the bit SHIFT of the vector SBV changes from a 0 to a 1, indicating the data byte in the second register 102 is flushed from the register 100. When the write request is removed, the FIFO register 100 returns to the FULL state. If desired, an additional write operation may be performed to flush out the remaining data byte held in the FIFO register 100.

The final operation of this example is a read operation. The read request is reflected in the vector TBV which becomes 1,0. The FIFO register 100 leaves the FULL state and enters the FULL READING state where it remains until the read request is removed.

Upon removal of the read request, the vector TBV becomes 0,0 and the FIFO register enters the DELAY state. When the delay period expires, the FIFO register 100 enters the stable HALF-FULL state. The bit SHIFT of the vector SBV changes from 0 to 1 indicating that the data in the first register 101 is transferred into the second register 102. The FIFO register 100 remains in the HALF-FULL state until a new operation is initiated.

The second example illustrates a simultaneous read and write operation. The example assumes the FIFO register 100 is still in the stable HALF-FULL state wherein the vector SBV has a value of 1,1,0,1 and the vector TBV has a value of 0,0. If a read and a write request are simultaneously initiated, the vector TBV becomes 1,1. This results in the FIFO register 100 entering the HALF-FULL READING/WRITING state.

The three pathways from the HALF-FULL READING/ WRITING state depend on which operation request, read or write, is removed first. For purposes of this example, assume the write request is removed first. The vector TBV becomes 1,0 and the FIFO register 100 enters the FULL READING state. When the read request is removed the vector TBV becomes 0,0 and the register 100 enters the DELAY state. Upon completion of the delay, the FIFO register 100 enters the HALF-FULL state wherein the vector bit SHIFT of the vector SBV changes from a 0 to a 1. This transition indicates that a data byte is transferred from the first register 101 into the second register 102.

The remaining transitions between the various states of the FIFO register 100 will not be discussed in detail. These transitions are clearly represented by the state diagram of FIG. 4. Any further description would be redundant in view of the above discussion.

As previously stated, the FIFO register 100 is particularly well suited to applications involving two control units. However, it should be understood that one skilled in the art may find other applications for the register. Such applications may include control units in numbers other than two and may involve functions other than data communication. It should also be understood that although the present invention and its embodiment have been described as allowing simultaneous read and write operations, the present invention is not limited to any particular relative timing sequence of the read and write operations. For example, the read operation by one controller may be performed independently of the write operation of another controller.

To define the preferred embodiment in greater detail, the following information is given by way of illustration and with no limitations intended. In the preferred embodiment, the multiplexers U23, U24 are Texas Instrument LS298 integrated circuits or equivalents and the latches U29, U18 are Texas Instruments LS374 integrated circuits or equivalents. The controller U35 is an erasable programmable logic device manufactured by Altera Corporation as product number EP300. The controller U35 was programmed using the 303A-009 programming/test adapter marketed by DATA I/O, Inc. The programming was performed with the aid of Advanced Boolean Expression Language ABEL also marketed by DATA I/O, Inc.

The foregoing detailed description has been given for illustration purposes only. A wide range of changes and modifications can be made to the preferred embodiment described above. It should therefore be understood that it is the following claims, including all equivalents, which are intended to define the scope of this invention.

What is claimed is:

1. A data storage device for storage and retrieval of data by first and second control units, the data storage device comprising:

a first register comprising first data storage means, and means for multiplexing data between one of the first and second control units and the first data storage means;

a second register comprising second data storage means, the second data storage means comprising means for receiving data from the first data storage means, the second register comprising means for allowing data to be retrieved from the second data storage means by the first and second control units; and a controller electrically connected to at least one of the first or second register and receiving a clock signal CLOCK, a read request SYDARD synchronized with the clock signal, a write request SYDAWR synchronized with the clock signal and a reset signal RESET; wherein the controller is operative to control the data transfer from the first register to the second register by means of a signal SHIFT and to output a register full status signal DRF and a register empty status signal; and wherein the signals CLOCK, SYDARD, SYDAWR, RESET, SHIFT, DRF, and DRE are generated in accordance with the following relations:

```
NOEXTUSE = (DRE* & DRF & SHIFT* & SYDAWR
  # NOEXTUSE & DRF & SHIFT
  # NOEXTUSE & DRE & DRF* & SHIFT* & SYDAWR*
  # DRE* & DRF & SHIFT & SYDARD* & SYDAWR*
  # NOEXTUSE* & DRE & DRF* & SHIFT & SYDARD*
  & SYDAWR*
  # NOEXTUSE & DRE* & DRF & SYDARD*);
SHIFT = (DRE* & DRF & SHIFT* & SYDAWR
  # NOEXTUSE & DRE* & DRF & SYDAWR
  # NOEXTUSE* & DRE & DRF & SYDAWR*
  # NOEXTUSE* & DRF & SYDARD* & SYDAWR
  # NOEXTUSE* & DRE & SHIFT & SYDARD &
  SYDAWR*);
DRE = (NOEXTUSE & DRE & DRF & SHIFT
  # DRE & DRF* & SHIFT*
  # NOEXTUSE* & DRF* & SHIFT* & SYDARD*
  # NOEXTUSE* & DRE & DRF* & SYDARD*
  # NOEXTUSE* & SHIFT* & SYDARD* & SYDAWR*
  # NOEXTUSE* & DRE & SYDAWR*); and
DRF = (DRE* & DRF & SHIFT*
  # NOEXTUSE & DRE* & DRF
  # NOEXTUSE* & DRF* & SHIFT* & SYDAWR*
  # NOEXTUSE* & DRF & SYDARD*
  # DRE* & DRF & SYDAWR*)
```
where # represents the boolean OR operation and & represents the boolean AND operation;

the controller operative to control a nonvirtual transfer of data from the first register to the second register such that data may be stored in the first register by one of the first and second control units while independently data is being retrieved from the second register by an other of the first and second control units and the data retrieved is a longest stored data in the data storage device.

2. A data storage device for storage and retrieval of data by at least first and second control units, the data storage device of a type wherein data is manipulated in units called a byte and a nibble where a nibble comprises at least one bit of information and a byte comprises at least a low order nibble and a high order nibble of data, the data storage device comprising:

a first and second multiplexer, each multiplexer comprising first storage means for storing one nibble of data, a first set of inputs to the first storage means and a second set of inputs to the first storage means; the first set of inputs of the first and second multiplexer electrically connected to receive low and high order nibbles of data respectively from the first control unit, the second set of inputs of the first and second multiplexer electrically connected to receive low and high order nibbles of data repectively from the second control unit; each multiplexer further comprising a set of outputs from the first storage means and a data select input electrically connected to at least one of the control units for controlling multiplexing of the first and second sets of input to the first storage means;

a first latch and a second latch, each latch comprising second storage means for storing a byte of data, a set of input and output lines to the second storage means, a latch control line for controlling latching of data from the input lines to the second storage means, and an output line for controlling outputting of data from the second storage means to the output lines; wherein the input lines corresponding to the low order nibble of each latch are connected to the output lines of the first multiplexer and the input lines corresponding to the high order nibble of each latch are connected to the output lines of the second multiplexer; and wherein each of the output enable lines of the first and second latch are electrically connected to at least one of the control units; and a controller comprising a clock input CLOCK; a read input SYDARD synchronized with the clock input; a write input SYDAWR synchronized with the clock input; a reset input RESET; a register full status output DRF; a register empty status output DRE; and a latch control output SHIFT; CLOCK, SYDARD, SYDAWR and RESET inputs and DRE, DRF and SHIFT outputs connected to the control units, wherein DRE, DRF AND SHIFT outputs are produced as follows:

---

NOEXTUSE = (DRE* & DRF & SHIFT* & SYDAWR
    # NOEXTUSE & DRF & SHIFT
    # NOEXTUSE & DRE & DRF* & SHIFT* & SYDAWR*
    # DRE* & DRF & SHIFT & SYDAWR*
    & SYDAWR* & SYDAWR*
    # NOEXTUSE & DRE* & DRF & SYDARD*);
SHIFT = (DRE* & DRF & SHIFT* & SYDAWR
    # NOEXTUSE & DRE* & DRF & SYDAWR
    # NOEXTUSE* & DRE & DRF & SYDAWR*
    # NOEXTUSE* & DRF & SYDARD* & SYDAWR
    # NOEXTUSE* & DRE & SHIFT & SYDARD & SYDAWR*);
DRE = (NOEXTUSE & DRE & DRF & SHIFT
    # DRE & DRF* & SHIFT*
    # NOEXTUSE* & DRF* & SHIFT* & SYDARD*
    # NOEXTUSE* & DRE & DRF* & SYDARD*
    # NOEXTUSE* & SHIFT* & SYDARD* & SYDAWR*
    # NOEXTUSE* & DRE & SYDAWR*); AND
DRF = (DRE* & DRF & SHIFT*
    # NOEXTUSE & DRE* & DRF
    # NOEXTUSE* & DRF* & SHIFT* & SYDAWR*
    # NOEXTUSE* & DRF & SYDARD*
    # DRE* & DRF & SYDAWR*);
    where # represents a boolean OR operation and & represents a boolean AND operation

---

* * * * *